US010220687B2

United States Patent
Tsubaki et al.

(10) Patent No.: US 10,220,687 B2
(45) Date of Patent: Mar. 5, 2019

(54) VEHICLE ELECTRICAL SYSTEM

(71) Applicant: Yazaki Corporation, Tokyo (JP)

(72) Inventors: Akira Tsubaki, Shizuoka (JP); Masataka Nishijima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/410,354

(22) Filed: Jan. 19, 2017

(65) Prior Publication Data

US 2017/0210209 A1    Jul. 27, 2017

(30) Foreign Application Priority Data

Jan. 26, 2016 (JP) ................................ 2016-012169

(51) Int. Cl.
| | |
|---|---|
| *B60J 5/06* | (2006.01) |
| *B60J 5/04* | (2006.01) |
| *G08C 17/02* | (2006.01) |
| *E05F 15/60* | (2015.01) |

(52) U.S. Cl.
CPC ................ *B60J 5/06* (2013.01); *B60J 5/047* (2013.01); *E05F 15/60* (2015.01); *G08C 17/02* (2013.01); *E05Y 2900/531* (2013.01)

(58) Field of Classification Search
CPC ........ H02G 11/00; B60R 16/0207; B60J 5/06; E05F 15/632; E05Y 2400/654; E05Y 2400/66
See application file for complete search history.

(56) References Cited

U.S. PATENT DOCUMENTS

| 5,140,316 A * | 8/1992 | DeLand | ..................... B60J 5/06 180/271 |
| 6,046,510 A * | 4/2000 | Kawanobe | ............... G05B 9/02 307/10.1 |
| 6,456,047 B1 * | 9/2002 | Gohara | ................. H02J 7/0093 320/162 |

(Continued)

FOREIGN PATENT DOCUMENTS

| JP | 7-306709 A | 11/1995 |
| JP | 2004-42879 A | 2/2004 |

(Continued)

OTHER PUBLICATIONS

Japanese Office Action for the related Japanese Patent Application No. 2016-012169 dated Jan. 23, 2018.

(Continued)

*Primary Examiner* — Justin B Rephann
(74) *Attorney, Agent, or Firm* — Kenealy Vaidya LLP

(57) ABSTRACT

A vehicle electrical system includes a wire harness routed between a sliding door opening/closing an opening of a vehicle and the vehicle, and including at least a power supply line for supplying power; and a transmission/reception unit that transmits/receives at least a portion of control signals between the vehicle and the sliding door. The transmission/reception unit includes a first transmission/reception unit mounted to the vehicle and a second transmission/reception unit mounted to the sliding door. The first transmission/reception unit and the second transmission/reception unit wirelessly communicates with each other.

3 Claims, 5 Drawing Sheets

(56) References Cited

U.S. PATENT DOCUMENTS

| | | | |
|---|---|---|---|
| 7,284,785 B2* | 10/2007 | Gotou | H02G 3/0475 |
| | | | 174/72 A |
| 9,843,178 B2* | 12/2017 | Terada | B60R 16/027 |
| 9,956,928 B2* | 5/2018 | Hartwig | B60R 16/0207 |
| 2002/0005014 A1* | 1/2002 | Doshita | B60R 16/027 |
| | | | 49/360 |
| 2002/0056233 A1* | 5/2002 | Gohara | B60J 5/06 |
| | | | 49/360 |
| 2002/0117896 A1* | 8/2002 | Gohara | B60L 1/003 |
| | | | 307/10.1 |
| 2006/0052054 A1 | 3/2006 | Uehara | |
| 2006/0056165 A1* | 3/2006 | Tsunoda | B60R 16/0207 |
| | | | 361/826 |
| 2006/0170244 A1* | 8/2006 | Blase | B60J 5/06 |
| | | | 296/155 |
| 2006/0254797 A1* | 11/2006 | Charara | B60R 16/0207 |
| | | | 174/72 A |
| 2006/0254800 A1* | 11/2006 | Itou | H02G 11/00 |
| | | | 174/100 |
| 2007/0084619 A1 | 4/2007 | Kisu et al. | |
| 2015/0188345 A1 | 7/2015 | Sohn et al. | |

FOREIGN PATENT DOCUMENTS

| | | |
|---|---|---|
| JP | 2007-151377 A | 6/2007 |
| JP | 2009-120156 A | 6/2009 |

OTHER PUBLICATIONS

Chinese Office Action for the related Chinese Patent Application No. 201710061686.9 dated Nov. 5, 2018.

\* cited by examiner

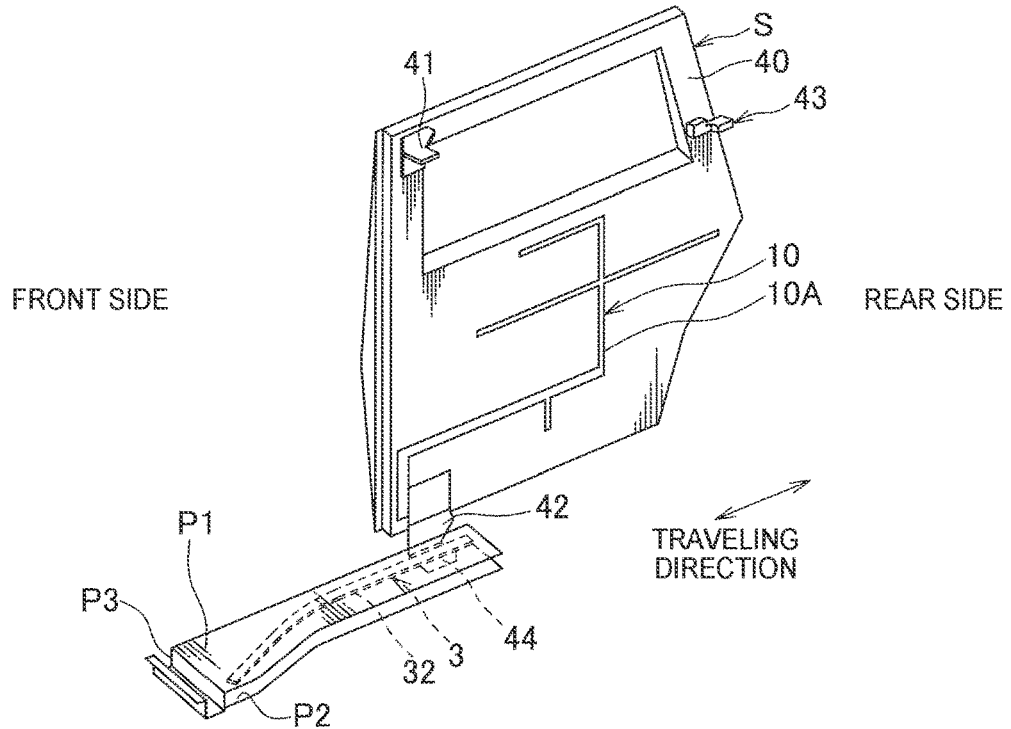
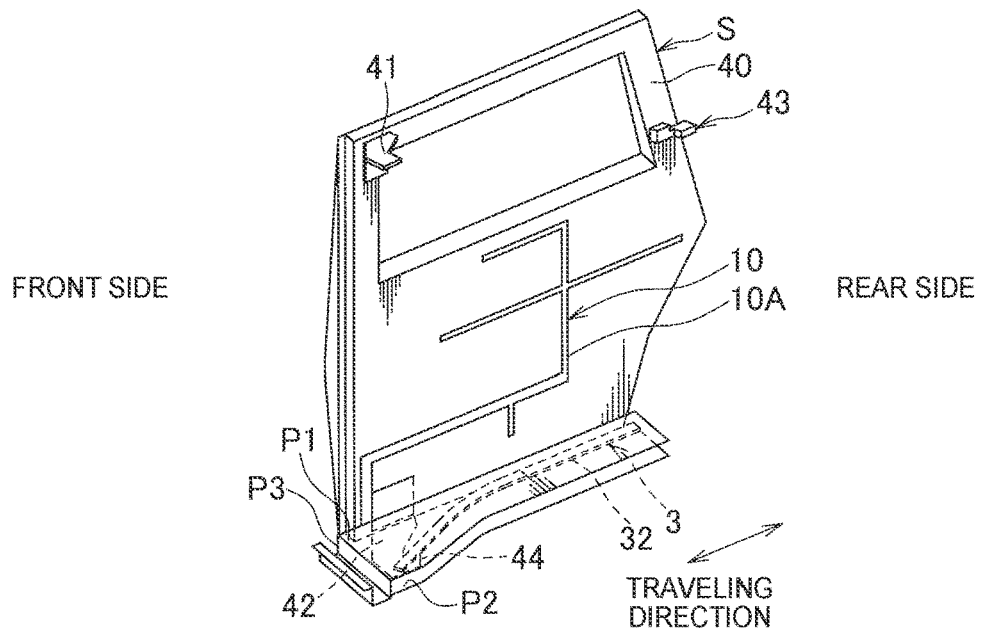

VEHICLE ELECTRICAL SYSTEM

BACKGROUND

Technical Field

The present invention relates to a vehicle electrical system.

Related Art

Conventionally, a sliding door that is opened and closed by a slide movement in an advancing direction is used for a lot of vehicles including wagons and one-box cars. Such a sliding door is provided with various electrical components such as a motor for a powered window, a door lock unit, and a speaker. Also, a wire harness (electric cable) for supplying power and transmitting/receiving electric signals between the vehicle and the electrical components provided to the sliding door is routed (see Patent Literature 1). In the invention disclosed in JP 2007-151377 A, an electric cable is routed as being bent between the vehicle and the sliding door.

Recently, the number of electrical components to be mounted to a sliding door is increased, leading to an increase in the number of electric cables to be routed. In addition, an amount of power to be supplied to each of electrical components is also increased, leading to an increase in size in the radial direction of an electric cable routed between the vehicle and the sliding door. Therefore, it is difficult to ensure the space for routing a large-sized electric cable between the vehicle and the sliding door. The technology to address this problem is disclosed in JP 2009-120156 A.

Patent Literature 2 discloses a vehicle electrical system comprising: a motor (electrical component) for a powered window provided to a door that can be opened/closed with respect to a vehicle body; a power feeding terminal mounted on the vehicle body; a power receiving terminal mounted to the door; a power supply line for supplying power from a battery mounted on the vehicle body to the motor for the powered window through the power feeding terminal and the power receiving terminal; and a capacitor mounted to the door and charged by power from the power supply line. When the door is opened and the power supply from the battery to the door is shut off, the vehicle electrical system activates the electrical components such as the motor for the powered window by power stored in the capacitor. In addition, this conventional vehicle electrical system also includes a control unit that is mounted to the vehicle body and issues an activation request signal to the electrical components, and a wireless communication unit that transmits/receives the activation request signal between the vehicle body and the door through wireless communication. The power feeding terminal and the power receiving terminal are composed of a contact connector. The vehicle electrical system described above supplies power to the motor for the powered window or the capacitor from the battery through the contact connector which is in contact with or separated from each other with the opening/closing of the door, whereby a harness for power supply and a harness for signal transmission, which are laid between the vehicle body and an opening/closing member such as a door, are eliminated.

The vehicle electrical system disclosed in Patent Literature 2 supplies power to the door from the vehicle body through the contact connector. Meanwhile, it is considered that the power supply is interrupted due to contact failure between both terminals of the contact connector when the door is closed. To address such a problem, JP 2009-120156 A discloses supplying power to the door from the vehicle body through an electromagnetic induction connector in place of the contact connector in the vehicle electrical system.

Patent Literature 1: JP 2007-151377 A
Patent Literature 2: JP 2009-120156 A

SUMMARY

However, in the conventional vehicle electrical system disclosed in Patent Literature 2, power is supplied only when the sliding door is closed, and in the state in which the door is opened a little, the power supply to the sliding door is not performed. To activate the motor for the powered window even with the door being opened, a capacitor is needed. In addition, reduction in power supply efficiency is considered in using electromagnetic induction.

In view of the foregoing problem, the present invention aims to provide a vehicle electrical system that can be downsized while efficiently supplying power to the sliding door.

In order to solve the object, the invention according to a first aspect is a vehicle electrical system including: a wire harness routed between a sliding door, which opens/closes an opening of a vehicle, and the vehicle and including at least a power supply line for supplying power; and a transmission/reception unit that transmits/receives at least a portion of control signals between the vehicle and the sliding door, wherein the transmission/reception unit includes a first transmission/reception unit mounted to the vehicle and a second transmission/reception unit mounted to the sliding door, the first transmission/reception unit and the second transmission/reception unit wirelessly communicating with each other.

The invention according to a second aspect is the vehicle electrical system according to the first aspect, wherein the wire harness further includes a signal line, and the signal line communicates a control signal concerning safety of an occupant.

The invention according to a third aspect is the vehicle electrical system according to the first or second aspect, wherein the vehicle is provided with a rail for guiding the sliding door in a slidable manner, the first transmission/reception unit is provided on the rail or near the rail, the sliding door includes a plate-shaped door body and a slider section projecting from the door body toward the rail and engaged with the rail, and the second transmission/reception unit is mounted to the slider section.

The invention according to a fourth aspect is the vehicle electrical system according to the third aspect, wherein the first transmission/reception unit is provided on an intermediate portion in the direction in which the rail extends.

According to the invention according to the first aspect, power is supplied between the vehicle and the sliding door through a power supply line (in a wired manner), and at least a portion of control signals is communicated in a wireless manner. According to the configuration in which power is supplied through the power supply line as described above, power can reliably be supplied to the sliding door at all times without using a capacitor as in the conventional technology, and as compared to the configuration in which power supply and transmission of all control signals are performed in a wired manner (through electric cables), an electric cable is radially downsized due to at least a portion of control signals being wirelessly communicated. Therefore, the vehicle electrical system that can be downsized while efficiently supplying power to the sliding door can be provided.

According to the invention according to the second aspect, the wire harness further includes a signal line, and the signal line communicates a control signal concerning safety of an occupant. Specifically, out of the control signals for controlling the sliding door or the electrical components mounted to the sliding door, the control signal concerning safety of the occupant is communicated through the signal line (wired manner), and the other control signals are communicated in a wireless manner. According to this configuration, malfunction due to noise in transmitting/receiving the control signal concerning safety of the occupant can be suppressed, as compared to the case in which all control signals are transmitted/received through wireless communication as in the conventional technology disclosed in Patent Literature 2.

According to the invention according to the third aspect, the first transmission/reception unit is provided on the rail or near the rail, and the second transmission/reception unit is provided on the slider section engaged with the rail. Thus, the first transmission/reception unit and the second transmission/reception unit are provided on positions where they are relatively close to each other, whereby reliability in communication by the transmission/reception units can be enhanced.

According to the invention according to the fourth aspect, the first transmission/reception unit is provided on the intermediate portion in the direction in which the rail extends. This configuration prevents the distance between the first transmission/reception unit and the second transmission/reception unit due to the movement of the sliding door from exceeding a half of the total length of the rail. Specifically, whether the sliding door is in a close position or in an open position, the distance between the second transmission/reception unit provided to the sliding door and the first transmission/reception unit provided on the rail does not exceed a half of the total length of the rail. Therefore, high reliability in communication between the first transmission/reception unit and the second transmission/reception unit can be ensured, no matter where the sliding door is located on the rail.

BRIEF DESCRIPTION OF DRAWINGS

FIG. 5A is perspective view schematically illustrating the sliding door illustrated in FIG. 2, and illustrates that the sliding door is in an open position;

FIG. 5B is perspective views schematically illustrating the sliding door illustrated in FIG. 2, and illustrates that the sliding door is in a close position;

DETAILED DESCRIPTION

A description will hereinafter be given of a vehicle electrical system according to one embodiment of the present invention with reference to FIGS. 1 to 5.

Figure 1:
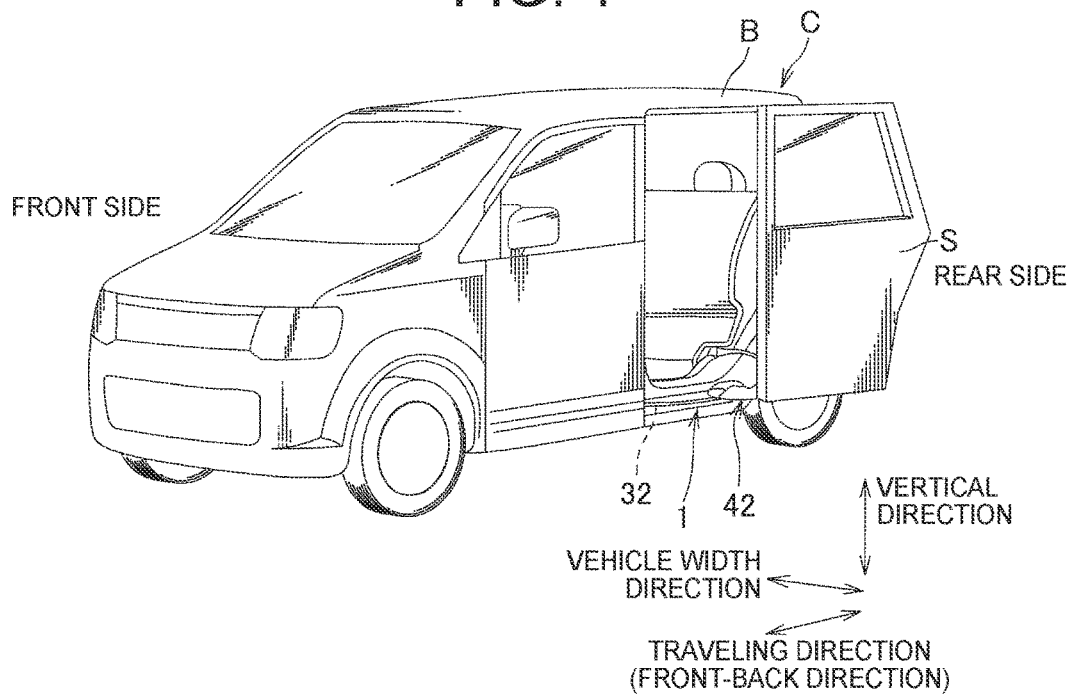
FIG. 1 is a schematic perspective view of a vehicle to which a vehicle electrical system according to one embodiment of the present invention is applied.

FIG. 1 is a schematic perspective view illustrating one example of a vehicle to which a vehicle electrical system 1 according to one embodiment of the present invention is applied. In FIG. 1, the vehicle includes a vehicle body B serving as a framework, and a sliding door S that is mounted to an opening portion (opening) of the vehicle body B to be freely opened/closed.

This sliding door S is provided with various electrical components such as an electric opening/closing device for electrically opening/closing a door body 40 (described later) or a window, a door lock device, an anti-trap device, an air-bag device, and a speaker. Among these components, those serving as a safety device for protecting an occupant, such as the air-bag device, is referred to as "safety electrical components" (not illustrated), and other electrical components such as the speaker is referred to as "electrical components other than safety components" (not illustrated). Specifically, the electric opening/closing device for electrically opening/closing the door body 40 (described later), the door lock device, the anti-trap device, the air-bag device, and the like are safety electrical components, and a speaker, a power window device, an illumination lamp, afoot light, and the like are the electrical components other than safety components. The various safety electrical components and electrical components other than safety components are controlled by an electronic control unit (ECU) not illustrated. A "control signal concerning safety of an occupant" in claims indicates a control signal for the safety electrical components.

The vehicle electrical system 1 includes a wire harness 10 routed between the vehicle body B and the sliding door S that opens/closes the opening of the vehicle body B, and a transmission/reception unit 2 that transmits/receives control signals to/from the electrical components other than safety components.

Figure 4A:
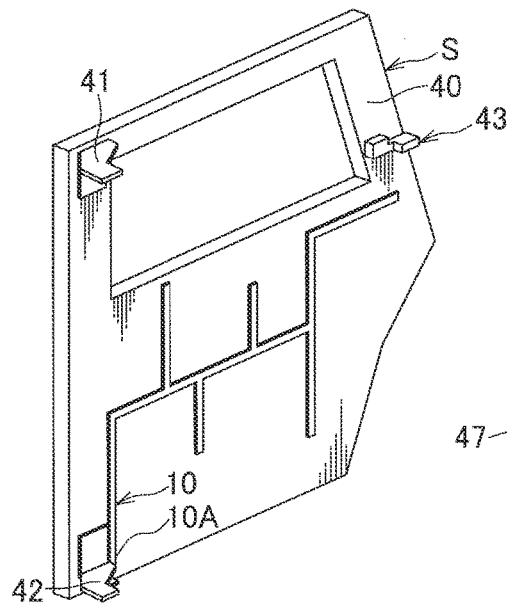
FIG. 4A is a perspective view schematically illustrating the sliding door illustrated in FIG. 2.

As illustrated in FIG. 4A, the wire harness 10 includes power supply lines that are connected to each of the safety electrical components and electrical components other than safety components to supply power to the corresponding electrical components, and signal lines that transmit control signals to the safety electrical components. In this way, the communication of the control signals to the safety electrical components is performed through the signal lines, i.e., in a wired manner, whereby malfunction of the safety electrical components caused by noise in transmitting/receiving the control signals can be prevented.

Figure 3:
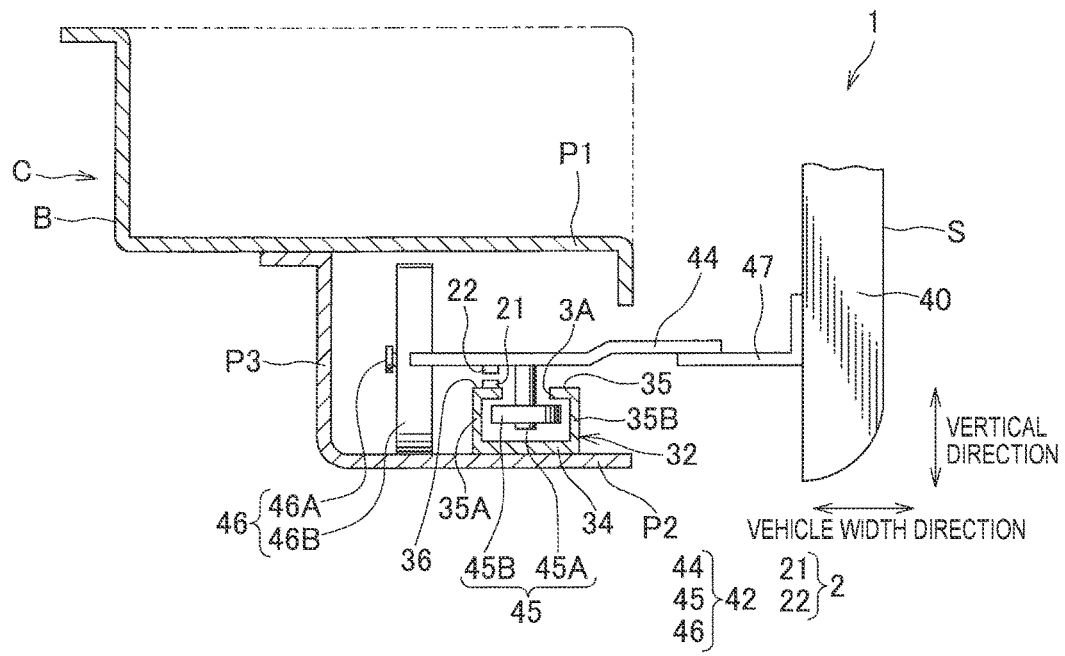
FIG. 3 is a sectional view illustrating a main part of the vehicle in FIG. 1.

As illustrated in FIG. 3, the transmission/reception unit 2 includes a first transmission/reception unit 21 provided to the vehicle body B and a second transmission/reception unit 22 provided to the sliding door S. The first transmission/reception unit 21 and the second transmission/reception unit 22 are configured to be substantially the same including a substrate and an antenna circuit formed on the substrate, and configured such that the antenna circuit in the first transmission/reception unit 21 and the antenna circuit in the second transmission/reception unit 22 mutually transmit and receive a control signal from the electronic control unit in a wireless manner. In this way, in the vehicle electrical system 1, control signals to the electrical components other than safety components are communicated between the first transmission/reception unit 21 and the second transmission/reception unit 22 in a wireless manner. Thus, the signal lines for transmitting control signals to the electrical components other than safety components can be eliminated from the wire harness 10 routed on the sliding door S from the vehicle C, whereby the wire harness 10 can radially be downsized by the signal lines, which are eliminated, to the electrical components other than safety components.

Figure 4B:
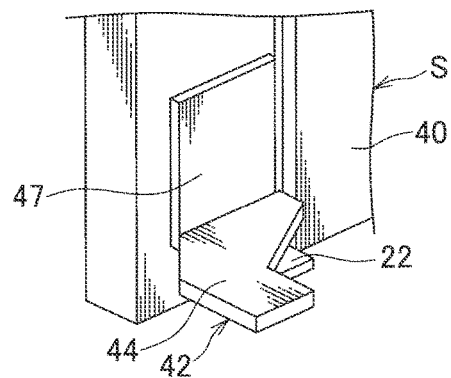
FIG. 4B is an enlarged view of a part of FIG. 4A.

The control signals wirelessly transmitted from the first transmission/reception unit 21 to the second transmission/reception unit 22 are transmitted to each of the electrical components other than safety components through the signal lines connected to the substrate of the second transmission/reception unit 22 as illustrated in FIGS. 4A and 4B. Note that FIG. 4A is a perspective view schematically illustrating the sliding door illustrated in FIG. 2. A wire harness 10A illustrated in FIG. 4A indicates a portion of the wire harness 10 embedded into the sliding door S, and also indicates a portion of the power supply line, a portion of the signal lines for transmitting control signals to the safety electrical components, and signal lines connected between the substrate of the second transmission/reception unit 22 and each of the electrical components other than safety components. Various electrical components are mounted on the end of the wire harness 10A.

Figure 2:
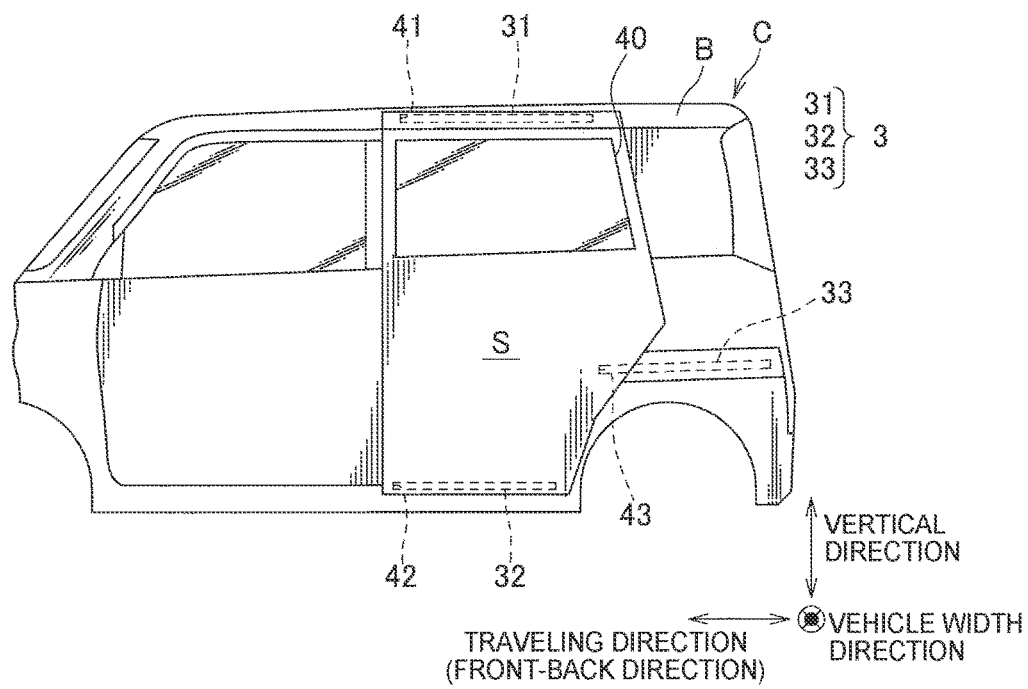
FIG. 2 is a side view illustrating a part of the vehicle illustrated in FIG. 1.

As illustrated in FIG. 2, a rail section 3 for enabling the slidable movement of the sliding door S in the traveling direction of the vehicle C is provided to the vehicle body B. The rail section 3 includes an upper rail 31 provided on an upper end defining the opening of the vehicle body B, a lower rail 32 (rail) provided on a lower end (step panel P1 that is a part of the vehicle body B) defining the opening of the vehicle body B, and a center rail 33 provided on the rear with respect to the opening of the vehicle body B in the traveling direction and extending to the rear side from the intermediate portion between the upper end and the lower end. In the traveling direction of the vehicle C, the left side in FIG. 2 is the direction (front side) in which the sliding door S fully closes the opening of the vehicle C, and the right side in FIG. 1 is the direction (rear side) in which the sliding door S fully opens the opening of the vehicle C.

In the present embodiment, the upper rail 31, the lower rail 32, and the center rail 33 have substantially the same configuration, so that the lower rail 32 will be described below as one example of the rail. In addition, an upper slider section 41, a lower slider section 42, and a center slider section 43, which will be described later, have substantially the same configuration, so that the lower slider section 42 will be described as one example of a slider section.

As illustrated in FIG. 3, the lower rail 32 is provided in a C-shaped space formed by the step panel P1 defining the opening of the vehicle body B, an under panel P2 located below step panel P1 so as to face the step panel P1, and a connection panel P3 which is continuous with the under panel P2 to be formed into an L shape and is connected to the step panel P1, the lower rail 32 being fixed to the upper surface of the under panel P2 between the step panel P1 and the under panel P2.

This lower rail 32 is made of a metal, and extends in the traveling direction (front-back direction) of the vehicle C. The lower rail 32 includes a rectangular bottom plate 34 fixed on the upper surface of the under panel P2, a pair of upright plates 35A and 35B standing upright from both ends of the bottom plate 34 in the width direction, and a pair of cover plates 36 extending toward the center in the width direction (vehicle width direction) from the ends of the pair of upright plates 35A and 35B distant from the bottom plate 34. The upright plate 35A out of the pair of upright plates 35A and 35B is located on the side distant from the sliding door S in the vehicle width direction, and the upright plate 35B is located closer to the sliding door S in the vehicle width direction than the upright plate 35A. A slit 3A into which a horizontal roller section 45 of the lower slider section 42 engaged with the lower rail 32 is inserted is formed between the pair of cover plates 36.

In addition, the first transmission/reception unit 21 is mounted on the center of the lower rail 32 in the front-back direction by means of a fixing unit, such as an adhesive, in a state of being electrically insulated from the lower rail 32. In the present embodiment, the first transmission/reception unit 21 is mounted on the upper surface of the cover plate 36 on the side of a support arm 44.

As illustrated in FIGS. 2, 4A, and 4B, the sliding door S includes the door body 40 composed of substantially a rectangular panel, the upper slider section 41 projecting from the door body 40 and engaged with the upper rail 31, the lower slider section 42 (slider section) projecting from the door body 40 and engaged with the lower rail 32, and the center slider section 43 projecting from the door body 40 and engaged with the center rail 33. These slider sections 41, 42, and 43 are mounted to the door body 40 in such away that, when the sliding door S is fully closed, the upper slider section 41, the lower slider section 42, and the center slider section 43 are located on the front ends of the upper rail 31, the lower rail 32, and the center rail 33, respectively, as illustrated in FIGS. 2 and 4A.

The sliding door S described above is configured to be slidable between an open position (illustrated in FIG. 5A) for fully opening the opening of the vehicle body B and a close position (illustrated in FIG. 5B) for fully closing the opening of the vehicle body B by the configuration in which the upper slider section 41 is engaged with the upper rail 31, the lower slider section 42 is engaged with the lower rail 32, and the center slider section 43 is engaged with the center rail 33.

As illustrated in FIGS. 3, 4A, and 4B, the lower slider section 42 includes the support arm 44 that projects from the back surface (the surface facing the interior of the vehicle) of the door body 40 toward the lower rail 32 in a form of a plate to face the bottom plate 34 of the lower rail 32, a horizontal roller section 45 that is supported by the support arm 44 and engaged with the lower rail 32 so as to be slidable with respect to the lower rail 32, and a traveling roller section 46 that is in sliding contact with the under panel P2 at the end of the support arm 44 distant from the door body 40. The lower slider section 42 is connected to the door body 40 through an L-shaped bracket 47.

As illustrated in FIG. 3, the horizontal roller section 45 includes a vertical shaft 45A projecting from the support arm 44 toward the bottom plate 34 of the lower rail 32 to be inserted into the slit 3A of the lower rail 32, and a horizontal roller 45B that is mounted to the vertical shaft 45A so as to be rotatable. The horizontal roller 45B is formed in a disc shape such that the diameter thereof is larger than the width of the slit 3A of the lower rail 32 and smaller than the distance between the pair of upright plates 35A and 35B.

The traveling roller section 46 includes a horizontal shaft 46A projecting from the support arm 44 toward the connection panel P3 and a traveling roller 46B mounted to the horizontal shaft 46A so as to be rotatable.

In addition, the second transmission/reception unit 22 is attached to the support arm 44 of the lower slider section 42 by means of a fixing unit such as an adhesive. In the illustration example, the second transmission/reception unit 22 is mounted on the position vertically facing the first transmission/reception unit 21 on the lower surface (the surface facing the lower rail 32) of the support arm 44.

In the vehicle electrical system 1 described above, the first transmission/reception unit 21 is provided on the lower rail 32 (rail), and the second transmission/reception unit 22 is provided on the lower slider section 42 (slider section) engaged with the lower rail 32. Accordingly, the control signal from the electronic control unit is transmitted and received between the first transmission/reception unit 21 and the second transmission/reception unit 22. Thus, the first transmission/reception unit 21 and the second transmission/reception unit 22 are located on positions where they are closest to each other, when the front end of the sliding door S is on the intermediate portion of the lower rail 32 in the front-back direction. Accordingly, when the front end of the sliding door S is on the intermediate portion of the lower rail 32 in the front-back direction, reliability in the communication between the first transmission/reception unit 21 and the second transmission/reception unit 22 can be enhanced.

In addition, since the first transmission/reception unit 21 is provided on the intermediate portion in the direction in which the lower rail 32 (rail) extends, the distance between the first transmission/reception unit 21 and the second transmission/reception unit 22 due to the movement of the sliding door S does not exceed a half of the total length of the lower rail 32. Specifically, whether the sliding door S is in the open position or in the close position, the distance between the second transmission/reception unit 22 provided to the sliding door S and the first transmission/reception unit 21 provided on the lower rail 32 does not exceed a half of the total length of the lower rail 32, whereby high reliability in communication between the first transmission/reception unit 21 and the second transmission/reception unit 22 can be ensured, no matter where the sliding door S is located on the lower rail 32.

Note that the present invention is not limited to the embodiment described above, and includes other configurations by which the object of the present invention can be achieved. That is, the modifications described below are included in the present invention.

Figure 6:
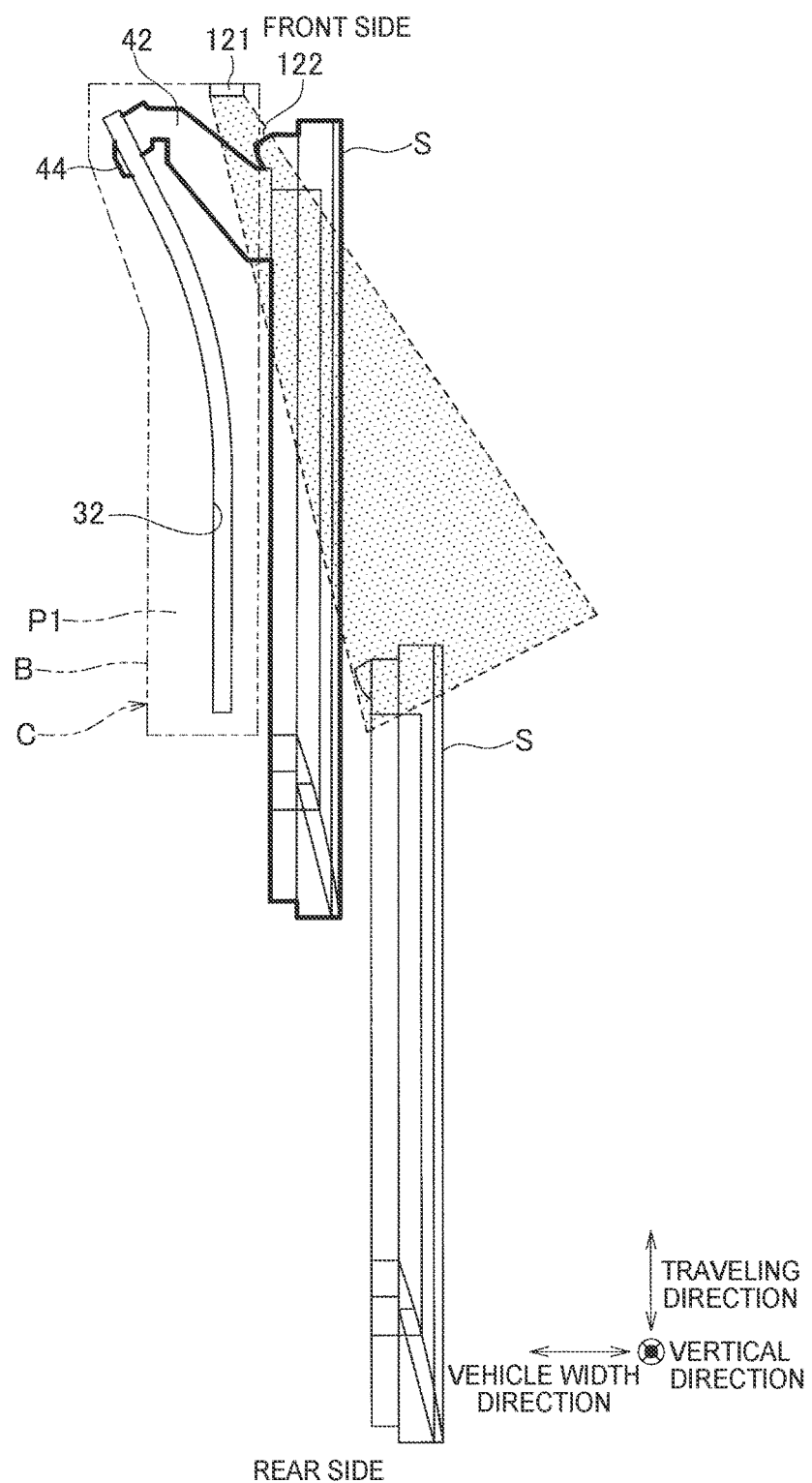
FIG. 6 is a top view illustrating a modification of the vehicle electrical system illustrated in FIG. 1.

The embodiment described above describes, as one example, the configuration in which the first transmission/reception unit 21 and the second transmission/reception unit 22 are located on positions where they are closest to each other when the front end of the sliding door S is on the intermediate portion of the lower rail 32 in the front-back direction. However, the present invention is not limited thereto. For example, as illustrated in FIG. 6, a first transmission/reception unit 121 mounted to the vehicle body B may be provided on the front end of the step panel P1 defining the opening of the vehicle body B. Note that, in FIG. 6, the sections having the same shape and same function as those in the above-mentioned embodiment are identified by the same reference numerals, and the description thereof will be omitted. In FIG. 6, the lower slider 42 and the support arm 44 of the sliding door S that is in the close position are not illustrated. In addition, in FIG. 6, the sliding door S in the close position is indicated by a bold line, the sliding door S in the open position is indicated by a thin line, and the communication range between the first transmission/reception unit 121 and a second transmission/reception unit 122 is indicated by a dotted pattern. In the embodiment illustrated in FIG. 6, a long-distance antenna may be used for the first and second transmission/reception units 121 and 122.

Figure 7:
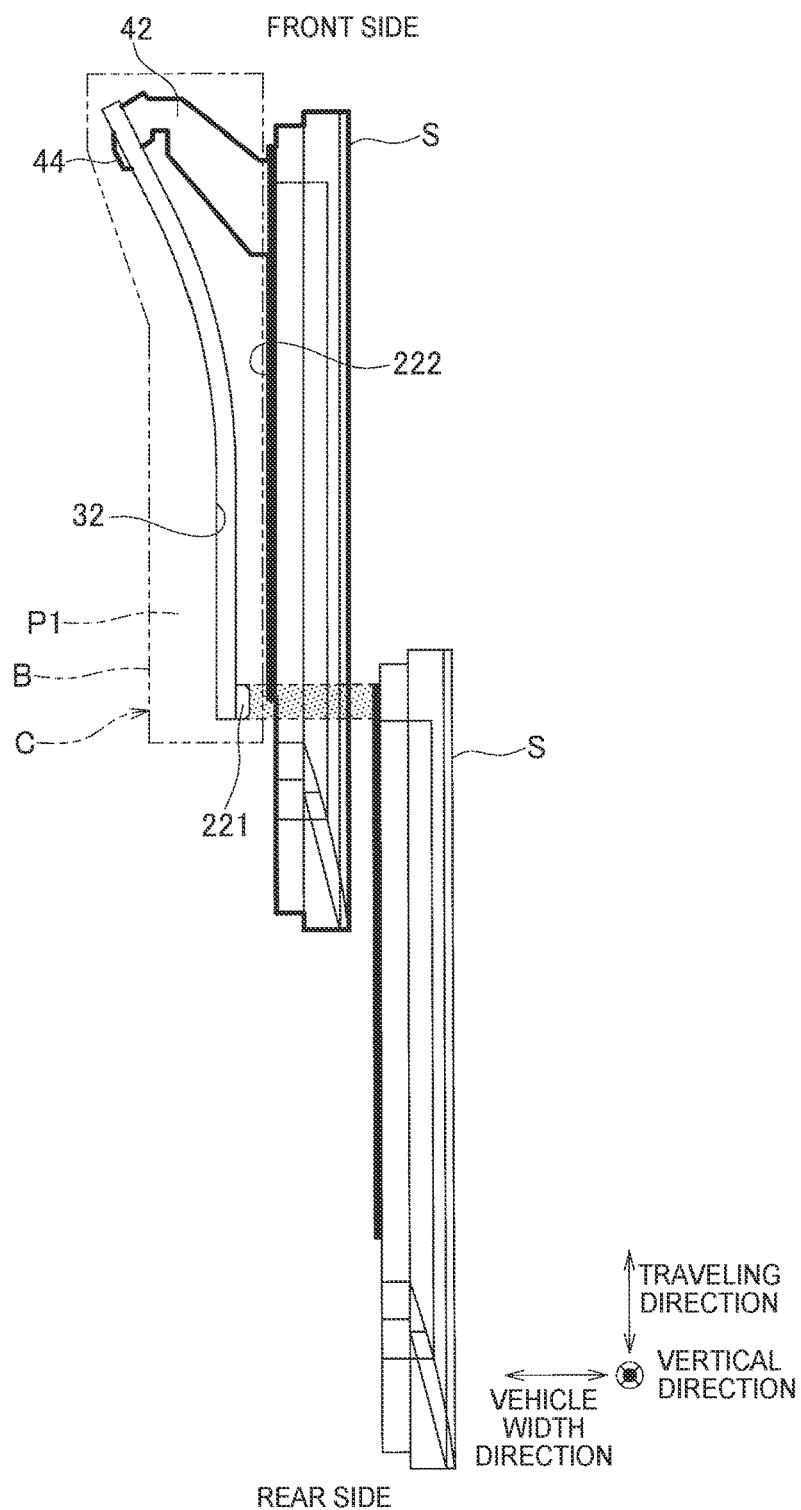
FIG. 7 is a top view illustrating another modification of the vehicle electrical system illustrated in FIG. 6.

In addition, as illustrated in FIG. 7, a first transmission/reception unit 221 may be provided on the rear end of the lower rail 32 and an antenna circuit (antenna) of a second transmission/reception unit 222 may be continuously provided throughout the entire length of the door body 40 in the front-back direction, in order that the first transmission/reception unit 221 and the second transmission/reception unit 222 are not separated from each other in a fixed distance or more no matter where the sliding door S is located from the open position to the close position. In this case, a short-distance antenna may be used for the first and second transmission/reception units 221 and 222. Note that, in FIG. 7, the sections having the same shape and same function as those in the above-mentioned embodiment are identified by the same reference numerals, and the description thereof will be omitted. In FIG. 7, similarly to FIG. 6, the lower slider 42 and the support arm 44 of the sliding door S that is in the close position are not illustrated. In addition, in FIG. 7, similarly to FIG. 6, the sliding door S in the close position is indicated by a bold line, the sliding door S in the open position is indicated by a thin line, and the communication range between the first transmission/reception unit 221 and the second transmission/reception unit 222 is indicated by a dotted pattern.

In addition, while the above-mentioned embodiment describes, as one example, the configuration in which the first transmission/reception unit 21 is attached on the upper surface of the cover plate 36 of the lower rail 32, the present invention is not limited thereto. The first transmission/reception unit may be mounted on an appropriate position of the vehicle body B. Similarly, while the above-mentioned embodiment describes, as one example, the configuration in which the second transmission/reception unit 22 is mounted on the support arm 44 of the lower slider section 42, the present invention is not limited thereto. The second transmission/reception unit 22 may be provided on an appropriate position of the bracket 47 or on an appropriate position of the door body 40. Specifically, the second transmission/reception unit may only be provided on an appropriate position of the sliding door S. That is, it is only necessary that the first transmission/reception unit is provided on an appropriate position of the vehicle body B and the second transmission/reception unit is provided on an appropriate position of the sliding door S in such a way that a control signal can be transmitted and received between the first transmission/reception unit and the second transmission/reception unit.

In addition, while the above-mentioned embodiment describes, as one example, the configuration in which a control signal to the electrical components other than safety components is communicated wirelessly, the present invention is not limited thereto. If being less susceptible to noise, the communication of a control signal to the safety electrical components may be wirelessly performed.

The above embodiments are shown as representative embodiments, and the present invention is not limited thereto. That is, those skilled in the art are capable of making various modifications according to conventional known knowledge without departing from the scope of the present invention. The modifications are included in the category of the present invention insofar as the configuration of the vehicle electrical system according to the present invention is enabled in the modifications.

REFERENCE SIGNS LIST

1 vehicle electrical system
2 transmission/reception unit
10 wire harness
21, 121, 221 first transmission/reception unit
22, 122, 222 second transmission/reception unit
32 lower rail (rail)
40 door body
42 lower slider section (slider section)

B vehicle body (vehicle)
S sliding door

What is claimed is:

1. A vehicle electrical system for a sliding door of a vehicle that selectively opens and closes an opening in the vehicle, the vehicle electrical system comprising:
    a wire harness arranged between the sliding door the vehicle, and including at least a power supply line configured to supply power to at least one electrical component provided on the sliding door; and
    a transmission/reception unit assembly configured to transmit and receive at least a portion of control signals between the vehicle and the sliding door, wherein
    the transmission/reception unit assembly includes a first transmission/reception unit mounted to the vehicle and a second transmission/reception unit mounted to the sliding door, the first transmission/reception unit and the second transmission/reception unit wirelessly communicating with each other,
    the vehicle is provided with a rail for guiding the sliding door in a slidable manner, the rail includes a bottom plate, a pair of upright plates, and a pair of cover plates, each of the upright plates extend away from the bottom plate, each of the cover plates extends from an end of a respective one of the upright plates and towards each other such that the cover plates are spaced away from each other by a slit, and each of the cover plates includes a first opposing surface,
    the sliding door includes a door body and a slider section projecting from the door body toward the rail and engaged with the rail, the slider section includes a second opposing surface that opposes the first opposing surfaces,
    the first transmission/reception unit is mounted to the first opposing surface of the cover plates, and
    the second transmission/reception unit is mounted to the second opposing surface of the slider section.

2. The vehicle electrical system according to claim 1, wherein
    the wire harness further includes a signal line, and
    the signal line communicates a control signal concerning safety of an occupant.

3. The vehicle electrical system according to claim 1, wherein the first transmission/reception unit is provided on an intermediate portion of the rail in a direction in which the rail extends in a front-back direction of the vehicle.

* * * * *